(12) United States Patent
Grey

(10) Patent No.: US 7,076,692 B2
(45) Date of Patent: Jul. 11, 2006

(54) SYSTEM AND METHOD ENABLING EXECUTION STOP AND RESTART OF A TEST EXECUTIVE SEQUENCE(S)

(75) Inventor: James Grey, Cedar Park, TX (US)

(73) Assignee: National Instruments Corporation, Austin, TX (US)

( * ) Notice: Subject to any disclaimer, the term of this patent is extended or adjusted under 35 U.S.C. 154(b) by 528 days.

(21) Appl. No.: 09/944,546

(22) Filed: Aug. 31, 2001

(65) Prior Publication Data

US 2003/0046612 A1    Mar. 6, 2003

(51) Int. Cl.
G06F 11/00    (2006.01)

(52) U.S. Cl. ............................................ 714/15; 714/16

(58) Field of Classification Search ................ 714/1, 714/48, 25, 26, 15, 16; 702/120
See application file for complete search history.

(56) References Cited

U.S. PATENT DOCUMENTS

| | | | |
|---|---|---|---|
| 5,758,174 A | | 5/1998 | Crump et al. |
| 5,864,657 A | * | 1/1999 | Stiffler ........................ 714/15 |
| 6,002,868 A | * | 12/1999 | Jenkins et al. .............. 717/105 |
| 6,044,475 A | * | 3/2000 | Chung et al. ................. 714/15 |
| 6,128,759 A | | 10/2000 | Hansen |
| 6,185,702 B1 | * | 2/2001 | Shirakihara et al. .......... 714/38 |
| 6,397,378 B1 | | 5/2002 | Grey et al. |
| 6,401,216 B1 | * | 6/2002 | Meth et al. ................... 714/16 |
| 6,594,779 B1 | * | 7/2003 | Chandra et al. .............. 714/15 |
| 2003/0093728 A1 | * | 5/2003 | Sutton ........................ 714/718 |

OTHER PUBLICATIONS

Microsoft Press, Computer Dictionary, 1997, Microsoft Press, Third Edition, p. 154.*
National Instruments Corporation, LabVIEW, "Test Executive Reference Manual," Aug. 1997.
Johnson, Laura, "Test and Measurement—Understanding Test Executives," Webpage www.testandmeasurement.com. content/news/ , Oct. 16, 2000, pp. 1-9.

* cited by examiner

Primary Examiner—Robert Beausoliel
Assistant Examiner—Marc Duncan
(74) Attorney, Agent, or Firm—Meyertons Hood Kivlin Kowert & Goetzel, P.C.; Jeffrey C. Hood; Jason L. Burgess

(57) ABSTRACT

A system and method for enabling execution stop and re-start of a test executive sequence or hierarchy of test executive sequences. Execution progress of a test executive sequence or test executive sequence hierarchy may be periodically stored. This may comprise performing or taking "snapshots" of the execution at various points during the execution. Performing a snapshot may comprise saving all data needed to restore and re-start the execution at the respective point. The criteria of when and where to perform the snapshots may be any of various criteria and may be specified in any of various ways.

26 Claims, 8 Drawing Sheets

FIG. 4

| Step | Description | Execution Flow | Comment |
|---|---|---|---|
| Power On | Numeric Limit Test, 12 <= x <= 15, volt, Call P... | Precondition | |
| CPU | Call MainSequence in cpu.seq | | |
| ROM | Pass/Fail Test, Call ROMTest (computer.dll) | Precondition | |
| RAM | Pass/Fail Test, Call RAMTest (computer.dll) | Precondition | |
| Video | Numeric Limit Test, 70 <= x <= 75, hertz, Call ... | Precondition | |
| Keyboard | Pass/Fail Test, Call KeyboardTest (computer.dll) | Precondition | |
| ROM Diagnostics | Action, Call ROMDiagnostics (computer.dll) | Precondition | |
| RAM Diagnostics | Action, Call RAMDiagnostics (computer.dll) | Precondition | |
| Video Diagnostics | Action, Call VideoDiagnostics (computer.dll) | Precondition | |
| Keyboard Diagnostics | Action, Call KeyboardDiagnostics (computer.dll) | Precondition | |
| END | | | |

SYSTEM AND METHOD ENABLING EXECUTION STOP AND RESTART OF A TEST EXECUTIVE SEQUENCE(S)

FIELD OF THE INVENTION

The present invention relates to the field of test executive software for organizing and executing test executive sequences. In particular, the invention relates to a system and method enabling execution stop and restart of a test executive sequence or hierarchy of test executive sequences.

DESCRIPTION OF THE RELATED ART

Test executive software is specialized software that allows a user to organize and execute sequences of reusable test modules to test units under test (UUTs). For example, the test modules may interact with one or more hardware instruments to test the UUT(s). The test modules often have a standard interface and typically can be created in a variety of programming environments. The test executive software operates as a control center for the automated test system. More specifically, the test executive software allows the user to create, configure, and/or control test sequence execution for various test applications, such as production and manufacturing test applications. Text executive software typically includes various features, such as test sequencing based on pass/fail results, logging of test results, and report generation, among others.

Test executives include various general concepts. The following comprises a glossary of test executive nomenclature, as used herein:

Code Module—A program module, such as a Windows Dynamic Link Library (.dll), LabVIEW VI (.vi), ActiveX component, or other type of program module or component, that implements one or more functions that perform a specific test or other action.

Test Module—A code module that performs a test of a UUT.

Step—An action that the user can include within a sequence of other actions. A step may call a test module to perform a specific test.

Step Module—The code module that a step calls.

Sequence—A series of steps that the user specifies for execution in a particular order. Whether and when a step is executed can depend on the results of previous steps.

Sequence File—A file that contains the definition of one or more sequences.

Sequence Editor—A program that provides a graphical user interface for creating, editing, and debugging sequences.

Run-time Operator Interface—A program that provides a graphical user interface for executing sequences on a production station. A sequence editor and run-time operator interface can be separate application programs or different aspects of the same program.

Test Executive Engine—A module or set of modules that provide an API for creating, editing, executing, and debugging sequences. A sequence editor or run-time execution operator interface uses the services of a test executive engine.

Application Development Environment (ADE)—A programming environment such as LabVIEW, LabWindows/CVI, Microsoft Visual C++, Microsoft Visual Basic, etc., in which the user can create test modules and run-time operator interfaces.

Unit Under Test (UUT)—The device or component that is being tested.

Thus, the user may use the sequence editor to construct a test executive sequence comprising a plurality of steps. The test executive sequence may then be executed to perform tests of a system or UUT.

Testing certain systems requires a very long time. For example, in the case of testing a satellite, the tests may run for days. Unfortunately, during execution of the test executive sequence(s) that test these systems, some type of failure occasionally occurs. Many types of failures are possible, such as an operating system crash, power failure, network failure, etc. Thus, it would be desirable to provide a test executive system operable to re-start the sequence execution at or near the point of the failure, so that the execution progress is not lost.

In many cases, the system under test can be logically or physically divided into sub-components that can be tested in a hierarchical manner. For example, consider a computer system having a chassis with several expansion slots and expansion boards attached to the expansion slots. Each expansion board may in turn have various elements, such as I/O channels, etc. In this example, the system as a whole may be viewed as a hierarchy of sub-components, e.g., the expansion slots, the various boards connected to the slots, I/O channels and other elements on the expansion slots, etc.

In a system comprising a hierarchy of sub-components such as described above, test developers often desire to organize test software in such a way as to mimic the system hierarchy. For example, one technique for achieving this is to create a hierarchy of test executive sequences, where each sequence maps to a sub-component of the system. Thus, in the example above, a first test executive sequence may be responsible for testing an expansion slot, e.g., physical connections for the slot. During execution of the first test executive sequence, the first test executive sequence may call a second test executive sequence to test an expansion board connected to the slot. This second test executive sequence may in turn call one or more additional test executive sequences to test the various sub-components of the expansion board.

When executing such a hierarchy of test executive sequences, a failure may occur in a sequence at any level within the hierarchy. Thus, an additional problem is how to re-start execution of the hierarchy of test executive sequences at some point within the hierarchy. One aspect of the problem is due to interactions among the test executive sequences. For example, when a first test executive sequence calls a second test executive sequence, the second test executive sequence often uses data that is set by the first test executive sequence. Therefore, without the first test executive sequence executing first to set this data correctly, the second test executive sequence may not execute correctly. Thus, it would be desirable to provide a test executive system operable to re-start the sequence execution at a particular test executive sequence within a test executive sequence hierarchy, such that execution is performed correctly.

SUMMARY OF THE INVENTION

One embodiment of the present invention comprises a system and method for enabling execution stop and re-start of a test executive sequence or hierarchy of test executive sequences. In one embodiment, execution progress of a test executive sequence or test executive sequence hierarchy may be periodically stored. For example, this may comprise performing or taking "snapshots" of the execution at various points during the execution. Performing a snapshot may comprise saving all data needed to restore and re-start the execution at the respective point. The snapshots may be persistently stored, e.g., in a file system or database. In various embodiments, the criteria of when and where to perform the snapshots may be any of various criteria and may be specified in any of various ways.

The snapshots may then be used to re-start execution of the test executive sequence(s) from the point in the execution corresponding to the snapshot, i.e., the point at which the snapshot was performed. For example, snapshots may be performed at various points, and in the case of an execution failure such as described above, the execution may be re-started from the most recent snapshot. In one embodiment, the user may specify a snapshot from which to re-start the execution. The ability to re-start the execution may also be useful to allow a user to request the execution to stop at a certain point, e.g., for debugging purposes, to enable the user to examine variable values, etc.

Any information related to the execution of the test executive sequence(s) that is necessary to successfully re-start an execution may be stored in a snapshot. In one embodiment, this may comprise storing information such as global variable values, sequence local variable values, runtime step property values, previous execution results, etc.

In one embodiment, execution may be able to be re-started from virtually every point in the test executive sequence or test executive sequence hierarchy. For example, snapshots may be performed after each step executes. In another embodiment, execution may not be able to be re-started from every point. Thus, it is possible that in the event of a failure requiring restart of the execution, a most recent portion of the execution will not be able to be restored.

In one embodiment, the system may be operable to perform snapshots using certain criteria inherent to or programmed into the test executive software. In another embodiment, the user may specify criteria for when to perform the snapshots.

In one embodiment, snapshots may be performed at certain time intervals. For example, the system may automatically perform a snapshot after a certain amount of time elapses, or the user may specify the time intervals at which the snapshots are desired. In another embodiment, snapshots may be taken based on results of the execution. For example, Boolean expressions or variables may be evaluated, and if the expressions or variables evaluate to True, then snapshots may be taken. The Boolean expression components or variable values may be set as a result of executing the test sequence(s).

In one embodiment, a separate or explicit step operable to perform the snapshot may be included in the test sequence. In another embodiment, the user may configure snapshots to be taken by setting a parameter or property of a sequence, and the snapshots are not necessarily performed by a separate step.

In one embodiment, execution of the test executive sequence may be stopped due to a failure of some kind, such as a software or hardware failure. In another embodiment, the user may request to stop the execution. For example, the user may desire to view certain variable values of the sequence, in order to debug the execution of the sequence.

In one embodiment, the test executive sequence being executed may be a nested sequence within a test executive sequence hierarchy. For example, the hierarchy of test executive sequences may be operable to test a hierarchical system such as described above. Each test executive sequence may map to a sub-component of the system and may be operable to test the respective sub-component. Thus, re-starting the execution may comprise re-creating or simulating an execution state for the entire chain of test executive sequences leading up to the point at which the snapshot is taken. This may include re-creating partial execution results for the sequence being executed when the snapshot was taken, i.e., for the portion of the sequence leading up to the point at which the snapshot is taken.

Snapshot information may be used to re-start execution of a test executive sequence or test executive sequence hierarchy in any of various ways. In one embodiment, the stack frame of the computer system may be re-created so that it is just as if the execution had run to the re-start point.

In one embodiment, in addition to re-creating data in memory, it may also be necessary to initialize states of one or more external (or internal) hardware devices used in the testing process. For example, assume a test executive sequence hierarchy in which a sequence being executed includes a first step that calls an external code module operable to set a first state of a first hardware device to a first value X. Suppose that execution fails in a subsequence of this sequence which is called after the first step, wherein the subsequence depends on the value X. If when the execution is subsequently re-started, the first state of the first hardware device is not set to X, then the subsequence may not execute correctly because the first step in the parent sequence which is operable to set the first state to X will not be executed again. Thus, the method may initialize states of one or more hardware devices, or software objects, used in the testing process.

In one embodiment, this problem may be solved by organizing test executive sequences in step groups. For example, a test executive sequence may comprise a setup group of steps, a main group of steps, a cleanup group of steps, etc. Steps which initialize hardware devices may be placed in the setup group. When execution of the test sequence hierarchy is re-started from within the subsequence, steps in the setup groups of sequences above the subsequence in the hierarchy may be executed. In other words, the sequences above the subsequence may be partially executed. Steps in other groups, such as a main group or cleanup group may not be executed. Any results from steps in these groups necessary to re-start execution may be stored when the snapshots are performed.

BRIEF DESCRIPTION OF THE DRAWINGS

A better understanding of the present invention can be obtained when the following detailed description of the preferred embodiment is considered in conjunction with the following drawings, in which:

FIG. 4 illustrates one example of a test executive sequence, created according to one embodiment of a test executive application;

Figure 1:
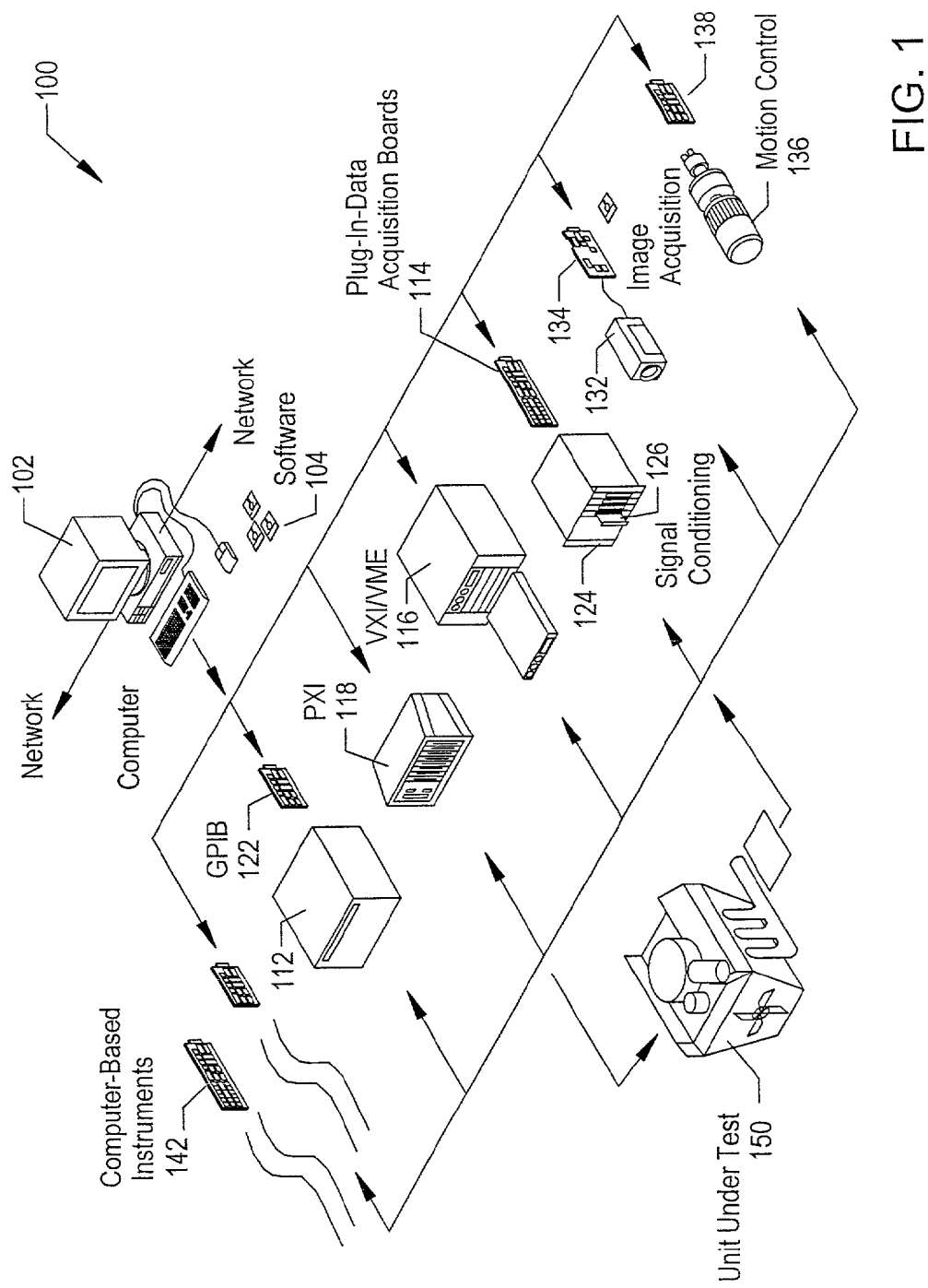
FIG. 1 illustrates an instrumentation control system according to one embodiment of the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Incorporation by Reference

The following references are hereby incorporated by reference in their entirety as though fully and completely set forth herein.

U.S. patent application Ser. No. 09/259,162 titled "Test Executive System and Method Including Step Types for Improved Configurability," filed Feb. 26, 1999.

U.S. patent application Ser. No. 09/943,988 titled "System and Method Enabling Hierarchical Execution of a Test Executive Subsequence," filed Aug. 31, 2001.

FIG. 1—Instrumentation System

FIG. 1 illustrates an exemplary instrumentation control system 100. The system 100 comprises a host computer 102 that connects to one or more instruments. The host computer 102 comprises a CPU, a display screen, memory, and one or more input devices such as a mouse or keyboard as shown. The computer 102 may connect through the one or more instruments to analyze, measure or control a unit under test (UUT) or process 150. It is noted that FIG. 1 is exemplary only, and the present invention may be used in conjunction with any of various systems, as desired.

In one embodiment, the UUT may be a system comprising a plurality of sub-components organized in a hierarchical manner. The computer 102 may execute a test executive sequence or test executive sequence hierarchy to perform automated tests of the system or portions of the system. As described below, the computer 102 may perform snapshots of the execution at various points during the execution, such that the snapshots can be used to re-start the execution in the event of a failure or requested stop of the execution.

The one or more instruments may include a GPIB instrument 112 and associated GPIB interface card 122, a data acquisition board 114 and associated signal conditioning circuitry 124, a VXI instrument 116, a PXI instrument 118, a video device 132 and associated image acquisition card 134, a motion control device 136 and associated motion control interface card 138, and/or one or more computer based instrument cards 142, among other types of devices.

The GPIB instrument 112 may be coupled to the computer 102 via a GPIB interface card 122 provided by the computer 102. In a similar manner, the video device 132 may be coupled to the computer 102 via the image acquisition card 134, and the motion control device 136 may be coupled to the computer 102 through the motion control interface card 138. The data acquisition board 114 may be coupled to the computer 102, and optionally interfaces through signal conditioning circuitry 124 to the UUT. The signal conditioning circuitry 124 preferably comprises an SCXI (Signal Conditioning eXtensions for Instrumentation) chassis comprising one or more SCXI modules 126.

The GPIB card 122, the image acquisition card 134, the motion control interface card 138, and the DAQ card 114 are typically plugged in to an I/O slot in the computer 102, such as a PCI bus slot, a PC Card slot, or an ISA, EISA or MicroChannel bus slot provided by the computer 102. However, these cards 122, 134, 138 and 114 are shown external to computer 102 for illustrative purposes. The cards 122, 134, 138 and 114 may also be implemented as external devices coupled to the computer 102, such as through a serial bus.

The VXI chassis or instrument 116 may be coupled to the computer 102 via a serial bus, MXI bus, or other serial or parallel bus provided by the computer 102. The computer 102 preferably includes VXI interface logic, such as a VXI, MXI or GPIB interface card (not shown), which interfaces to the VXI chassis 116. The PXI chassis or instrument is preferably coupled to the computer 102 through the computer's PCI bus.

A serial instrument (not shown) may also be coupled to the computer 102 through a serial port, such as an RS-232 port, USB (Universal Serial bus) or IEEE 1394 or 1394.2 bus, provided by the computer 102. In typical systems an instrument will not be present of each interface type, and in fact many systems may only have one or more instruments of a single interface type, such as only GPIB instruments.

The instruments are coupled to the unit under test (UUT) or process 150, or are coupled to receive field signals, typically generated by transducers. Other types of instruments or devices may be connected to the system, as desired.

The computer system 102 may include a memory medium on which test executive software according to one embodiment of the present invention is stored. The test executive software may allow a user to create, configure, and/or control test executive sequence execution for various test applications, such as production and manufacturing test applications. As described below, the test executive software may include functionality for performing snapshots of the execution of a test executive sequence.

The term "memory medium" is intended to include an installation medium, e.g., a CD-ROM, floppy disks 104, or tape device; a computer system memory or random access memory such as DRAM, SRAM, EDO RAM, Rambus RAM, etc.; or a nonvolatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer that connects to the first computer over a network, such as the Internet. In the latter instance, the second computer may provide program instructions to the first computer for execution. The host computer CPU executing code and data from the memory medium may comprise a means for implementing the methods described below.

Figure 2:
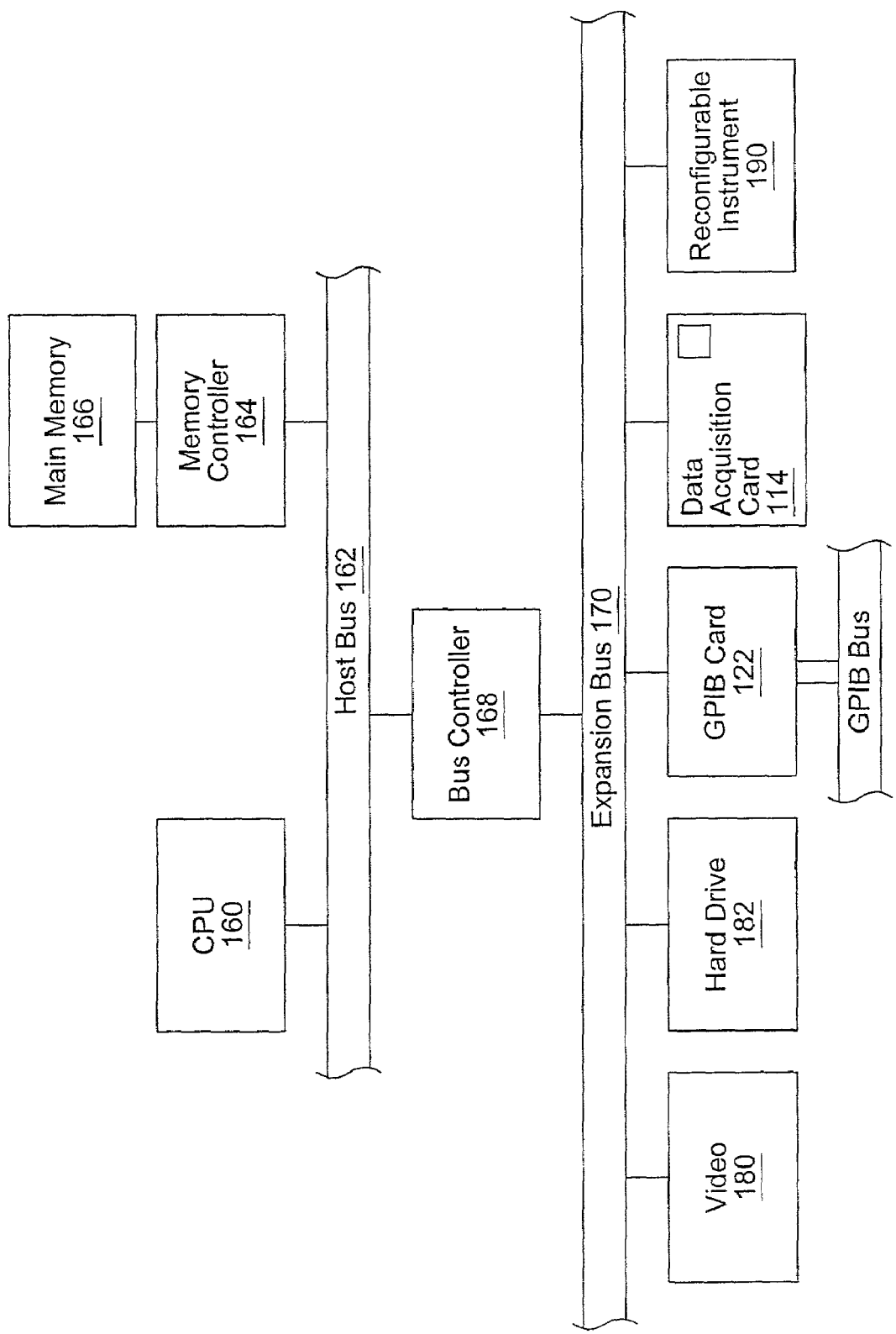
FIG. 2 is a block diagram of the computer system of FIG. 1.

FIG. 2—Computer System Block Diagram

FIG. 2 is a block diagram of the computer system illustrated in FIG. 1. It is noted that any type of computer system configuration or architecture can be used as desired, and FIG. 2 illustrates a representative PC embodiment. It is also noted that the computer system may be a general purpose computer system as shown in FIG. 1, a computer implemented on a VXI card installed in a VXI chassis, a computer implemented on a PXI card installed in a PXI chassis, or other types of embodiments. Elements of a computer not necessary to understand the present invention have been omitted for simplicity.

The computer 102 includes at least one central processing unit or CPU 160 that is coupled to a processor or host bus 162. The CPU 160 may be any of various types, including an x86 processor, e.g., a Pentium class, a PowerPC processor, a CPU from the SPARC family of RISC processors, as well as others. Main memory 166 is coupled to the host bus 162 by means of memory controller 164.

The main memory 166 may store software according to one embodiment of the present invention, such as test executive software with functionality as described above with reference to FIG. 1. The main memory 166 may also store operating system software as well as other software for operation of the computer system, as well known to those skilled in the art.

The host bus 162 is coupled to an expansion or input/output bus 170 by means of a bus controller 168 or bus bridge logic. The expansion bus 170 is preferably the PCI (Peripheral Component Interconnect) expansion bus, although other bus types can be used. The expansion bus 170 includes slots for various devices such as the data acquisition board 114 (of FIG. 1) and a GPIB interface card 122 that provides a GPIB bus interface to the GPIB instrument 112 (of FIG. 1). The computer 102 further comprises a video display subsystem 180 and hard drive 182 coupled to the expansion bus 170.

As shown, a reconfigurable instrument 190 may also be connected to the computer 102. The reconfigurable instrument 190 may include a functional unit, also referred to as configurable logic, such as a programmable logic device (PLD), e.g., an FPGA, or a processor and memory, which may execute a real time operating system. Program instructions may be downloaded and executed on the reconfigurable instrument 190. In one embodiment, at least a portion of the test executive software described herein may execute on the reconfigurable instrument 190. In various embodiments, the functional unit may be comprised on an instrument or device connected to the computer through means other than an expansion slot, e.g., the instrument or device may be connected via an IEEE 1394 bus, USB, or other type of port. Also, the functional unit may be comprised on a device such as the data acquisition board 114 or another device shown in FIG. 1.

Test Executive Software Components

Figure 3:
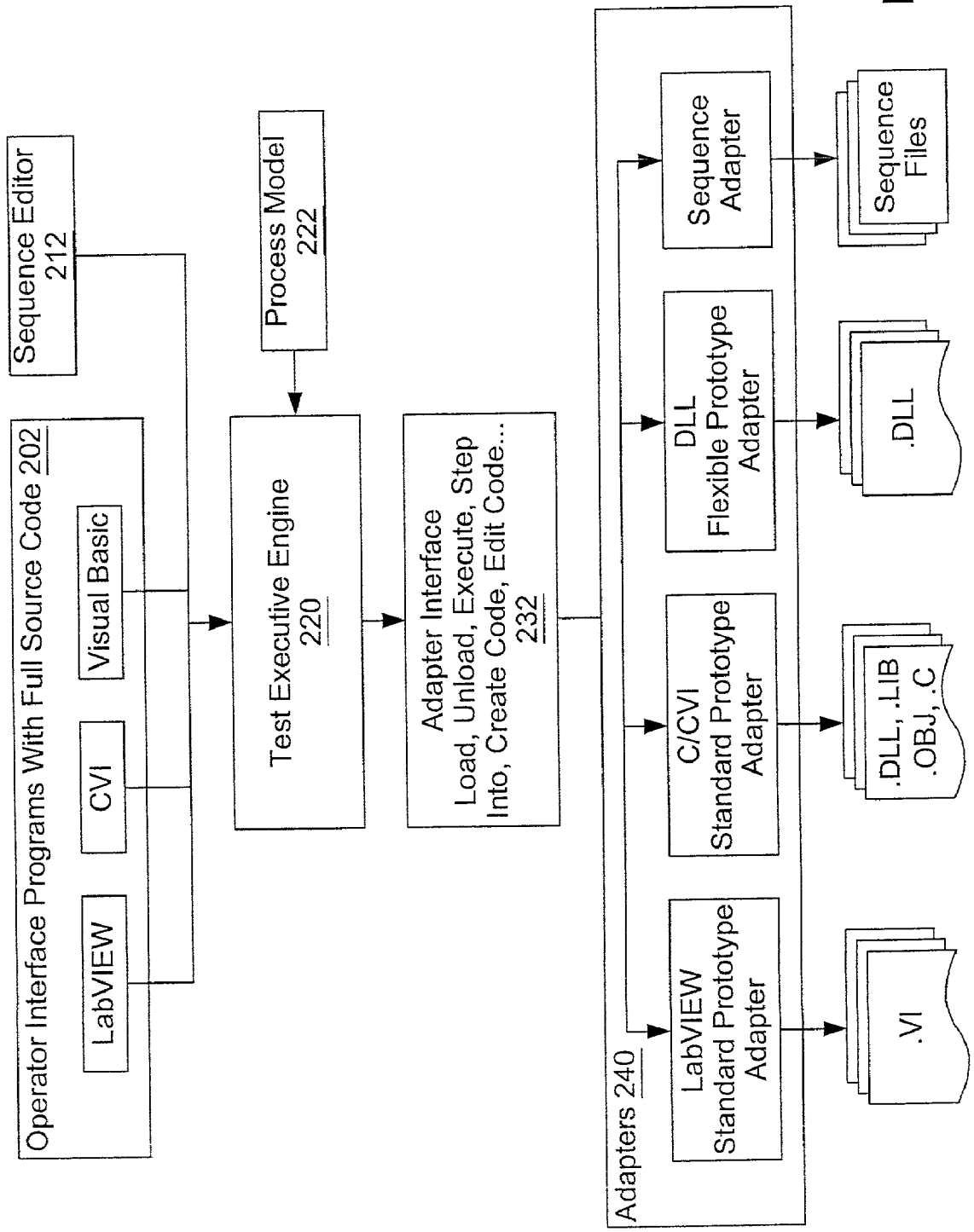
FIG. 3 illustrates a test executive application software architecture according to one embodiment of the present invention.

FIG. 3 is a block diagram illustrating high-level architectural relationships between elements of one embodiment of a test executive software application. It is noted that FIG. 3 is exemplary, and the present invention may be utilized in conjunction with any of various test executive software applications or architectures. In one embodiment, the elements of FIG. 3 are comprised in the TestStand test executive product from National Instruments. As shown, the test executive software of FIG. 3 includes operator interface programs 202 for interfacing to various software programs. The operator interface programs 202 shown in FIG. 3 are for creating operator interface programs using the LabVIEW, LabWindows/CVI, and Visual Basic application development environments. However, additional operator interface programs 202 may be included for development with other application development environments.

The test executive software of FIG. 3 also includes a sequence editor 212 for creating and editing test executive sequences. The sequence editor 212 and the operator interface programs 202 interface to the test executive engine 220. One or more process models 222 couple to the test executive engine 220. The test executive engine 220 interfaces through an adapter interface 232 to one or more adapters 240. The adapters shown in FIG. 3 include the LabVIEW standard prototype adapter, the C/CVI prototype adapter, the DLL flexible prototype adapter, and the sequence adapter. The LabVIEW standard prototype adapter interfaces to program modules having a .VI extension, i.e., LabVIEW graphical programs. The C/CVI prototype adapter interfaces to program modules having a .dll, .lib, .obj, or .c extension. The DLL flexible prototype adapter interfaces to program modules having a .dll extension. The sequence adapter interfaces to sequence files.

The test executive engine 220 manages the execution of test executive sequences. Sequences comprise steps that may call external code modules. By using module adapters 240 that have the standard adapter interface 232, the test executive engine 220 can load and execute different types of code modules. Thus, the test executive may be independent from particular application development environments (ADEs) used to create the code modules. In one embodiment, the test executive may use a special type of sequence called a process model to direct the high-level sequence flow. The test executive engine 220 may implement an API used by the sequence editor 212 and run-time operator interfaces 202.

Test Executive Sequence Editor

The sequence editor 212 may be an application program in which the user creates, modifies, and/or debugs test executive sequences. The sequence editor 212 may have a graphical user interface (GUI) enabling a user to efficiently create a test executive sequence for testing a system or unit under test. For example, the sequence editor 212 may provide the user with easy access to test executive features, such as step types, step properties, sequence parameters, step result collection, etc.

Figure 5:
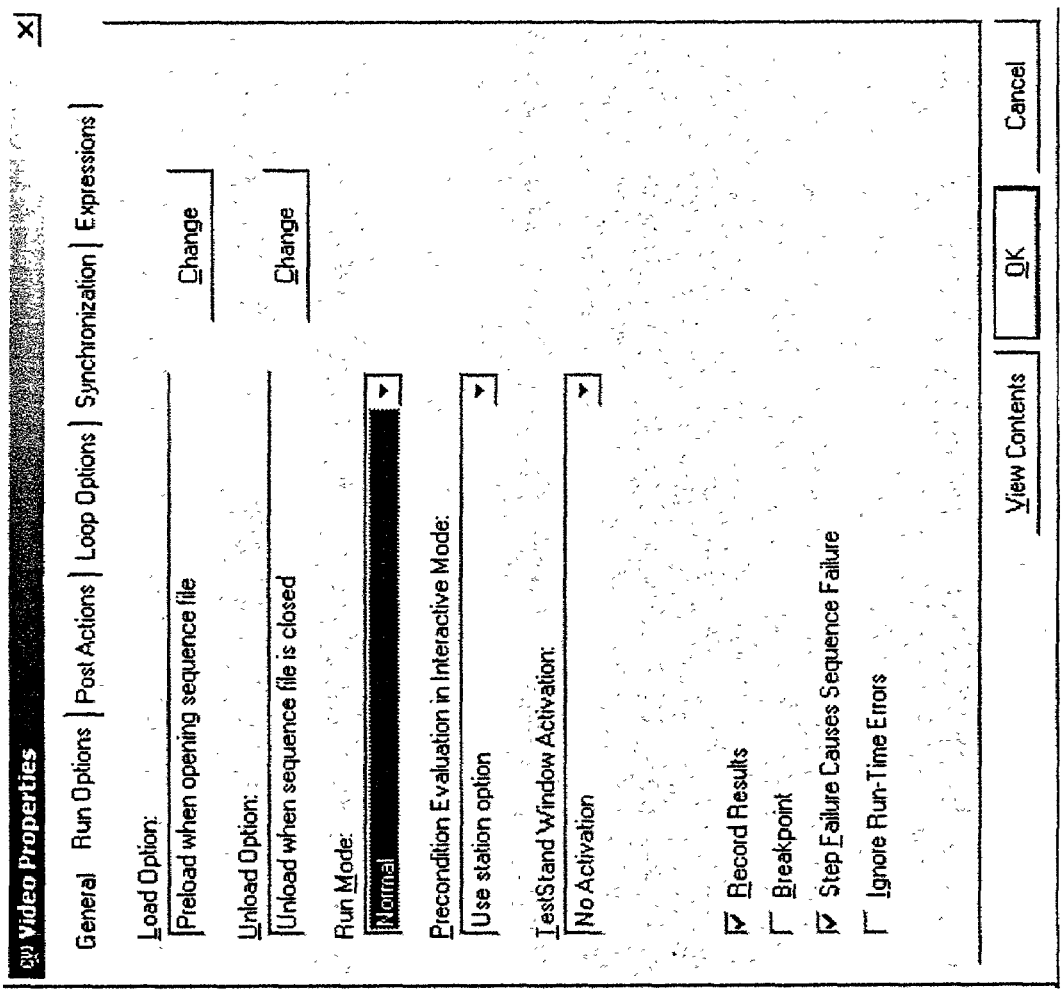
FIG. 5 illustrates an exemplary dialog box for a test executive step, which enables the user to specify various properties for the step that affect the way the test executive software manages the execution of the step.

FIG. 4 illustrates one example of a test executive sequence, created according to one embodiment of a sequence editor 212. The exemplary sequence of FIG. 4 comprises a plurality of test executive steps operable to test various aspects of a computer system. For example, the sequence includes a "ROM" step to test the computer's read-only memory, a "RAM" step to test the computer's random access memory, etc. Each step may call an external code module that interacts with the computer system to perform the desired test. The user may also specify various properties for each step that affect the way the test executive software manages the execution of the step. For example, FIG. 5 illustrates an exemplary dialog box for the "Video" step. As shown, a "Run Options" property page is selected in FIG. 5. The "Run Options" property page enables the user to specify various options for the step, such as whether to record test results for the step, whether to break execution when the step is reached, whether to pre-load the step when opening the sequence file, etc.

In some cases, test executive sequences may be created to test a system that includes a plurality of sub-components. Often, the system sub-components may be conceptualized as a hierarchy of sub-components, e.g., as in the example given above with sub-components of expansion slots, expansion boards, elements on the expansion boards, etc. To test such a system, a user may utilize the sequence editor 212 to create a plurality of test executive sequences. Each test executive sequence may map to a sub-component of the system. (In some cases, only a portion of the system under test may be conceptualized as a hierarchical system; in this case the plurality of test executive sequences may map to the plurality of sub-components in this portion of the system.)

Thus, the plurality of test executive sequences may also be seen as a hierarchy analogous to the hierarchy of the system. It is noted, however, that in some embodiments there may not be an exact mapping of test executive sequences to system sub-components. For example, some of the test executive sequences may be operable to perform tests that do not specifically test a system sub-component. These test executive sequences may not have a corresponding system sub-component. However, the hierarchy of test executive sequences may still mimic the system hierarchy, at least loosely.

In one embodiment, the hierarchy of test executive sequences may be structured in a tree form, wherein each child test executive sequence in the tree is called by a parent test executive sequence. For example, when a test executive sequence at the root of the tree is executed, this root test executive sequence may call its child test executive sequences, which then call their child test executive sequences, etc. The tree may be traversed in any of various ways in order to execute the test executive sequences. It is noted that in other embodiments, the plurality of test executive sequences may be structured using any of various other hierarchical techniques, instead of as a tree structure.

Figure 6:
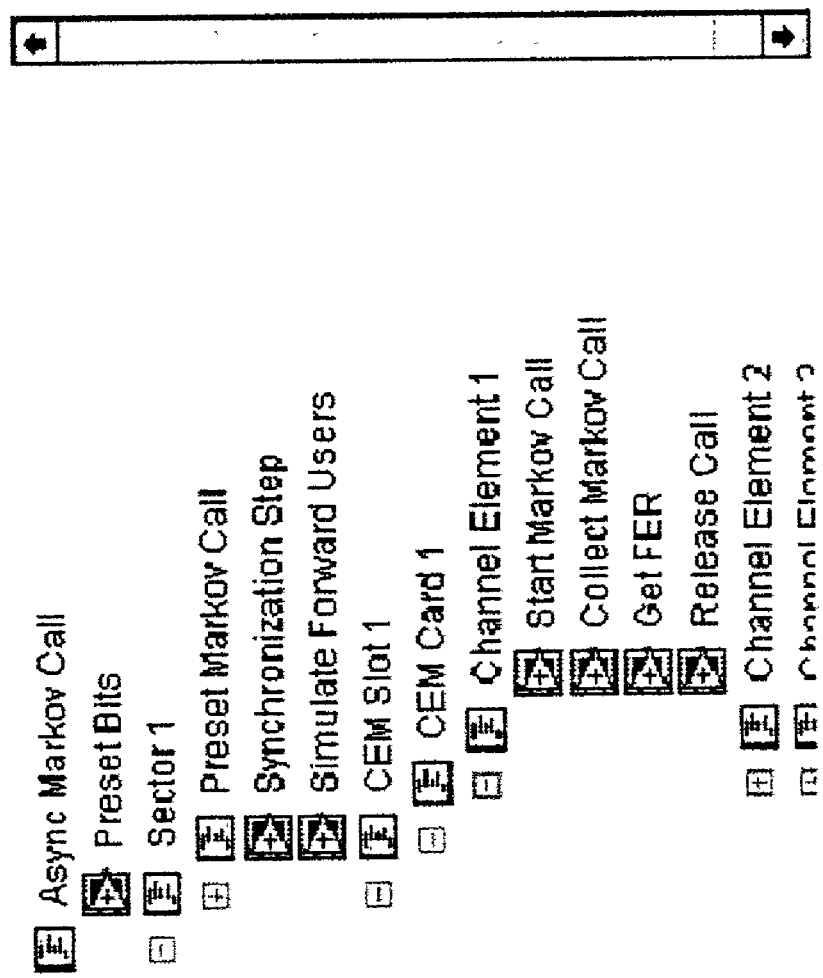
FIG. 6 illustrates an exemplary GUI display of a tree of test executive sequences.

In one embodiment, the sequence editor 212 may enable users to structure and display the plurality of test executive sequences hierarchically in a GUI of the sequence editor. For example, FIG. 6 illustrates a GUI display of a tree of test executive sequences. In this example, the root test executive sequence is named "Async Markov Call". As illustrated, sequences named "Preset Bits" and "Sector 1" are located one level below the root test executive sequence. The "Sector 1" sequence has child sequences named "Prset Markov Call", "Synchronization Step", "Simulate Forward Users", and "CEM slot 1", etc.

In other embodiments, the plurality of test executive sequences may execute in a hierarchical manner, but the sequence editor 212 may not necessarily provide the ability to display the sequences hierarchically. As an example, a hierarchy or chain of three test executive sequences, sequence A, sequence B, and sequence C may be created, wherein sequence A calls sequence B, and sequence B calls sequence C. In this example, each of these three sequences may be created independently, and the sequence editor 212 may not provide the ability to visually indicate the sequence hierarchy.

In one embodiment, the sequence editor 212 may also include an execution window that provides debugging tools, e.g., those found in application development environments such as LabVIEW, LabWindows/CVI, Microsoft Visual C/C++, Microsoft Visual Basic, etc. These may include features such as breakpoints, single stepping, tracing, a variable display, and a watch window.

In one embodiment, in the sequence editor 212, the user may start multiple concurrent executions. Multiple instances of the same sequence can be executed, and different sequences can be executed at the same time, e.g., as separate threads in a multi-threaded system. Each execution instance has its own execution window. In trace mode, the execution window may display the steps in the currently executing sequence. When execution is suspended, the execution window may display the next step to execute and provide single-stepping options.

Test Executive Engine

The test executive engine 220 may be used when creating, editing, executing, and debugging test executive sequences. The test executive engine 220 may also provide a test executive engine application programming interface (API) that enables another program to interface with the test executive engine 220 in order to perform these actions. In one embodiment, the test executive engine 220 may export an object-based or component-based API, which in one embodiment may be an ActiveX Automation API. The sequence editor 212 and run-time operator interfaces 202 may use the test executive engine API. The engine API may be called from any programming environment able to use the API. For example, where the API comprises an ActiveX Automation API, the engine API may be called from any programming environment that supports access to ActiveX Automation servers. Thus, in various embodiments, the engine API may be called from test modules written in various programming environments, including test modules that are written in LabVIEW, LabWindows/CVI, Microsoft Visual C++, Microsoft Visual Basic, Java, etc.

One task performed by the test executive engine 220 is to manage the execution of test executive sequences. Executing a sequence may comprise executing steps included in the sequence. Not all steps in the sequence are necessarily executed. For example, the user may configure some steps to be skipped, e.g., depending on execution results of previous steps. For a step that references a user-supplied code module, executing the step may comprise executing the respective code module. In addition to these user-supplied code modules being executed, for each step, additional program instructions may be executed, wherein these additional program instructions implement additional functionality specified for the step. These additional program instructions may be specified by the test executive software, rather than being defined by the respective user-supplied code module for the step. As one example, when including a step in a sequence, the user may configure execution results of the step to be collected. In this example, when the step is executed, program instructions to store the step results accordingly may be executed in addition to the program instructions of a user-supplied code module that the step references. It is noted that not all steps may reference a user-supplied code module. For example, the test executive may provide some step types that primarily affect various aspects of sequence execution and are not designed to reference user-supplied code modules.

Figure 7:
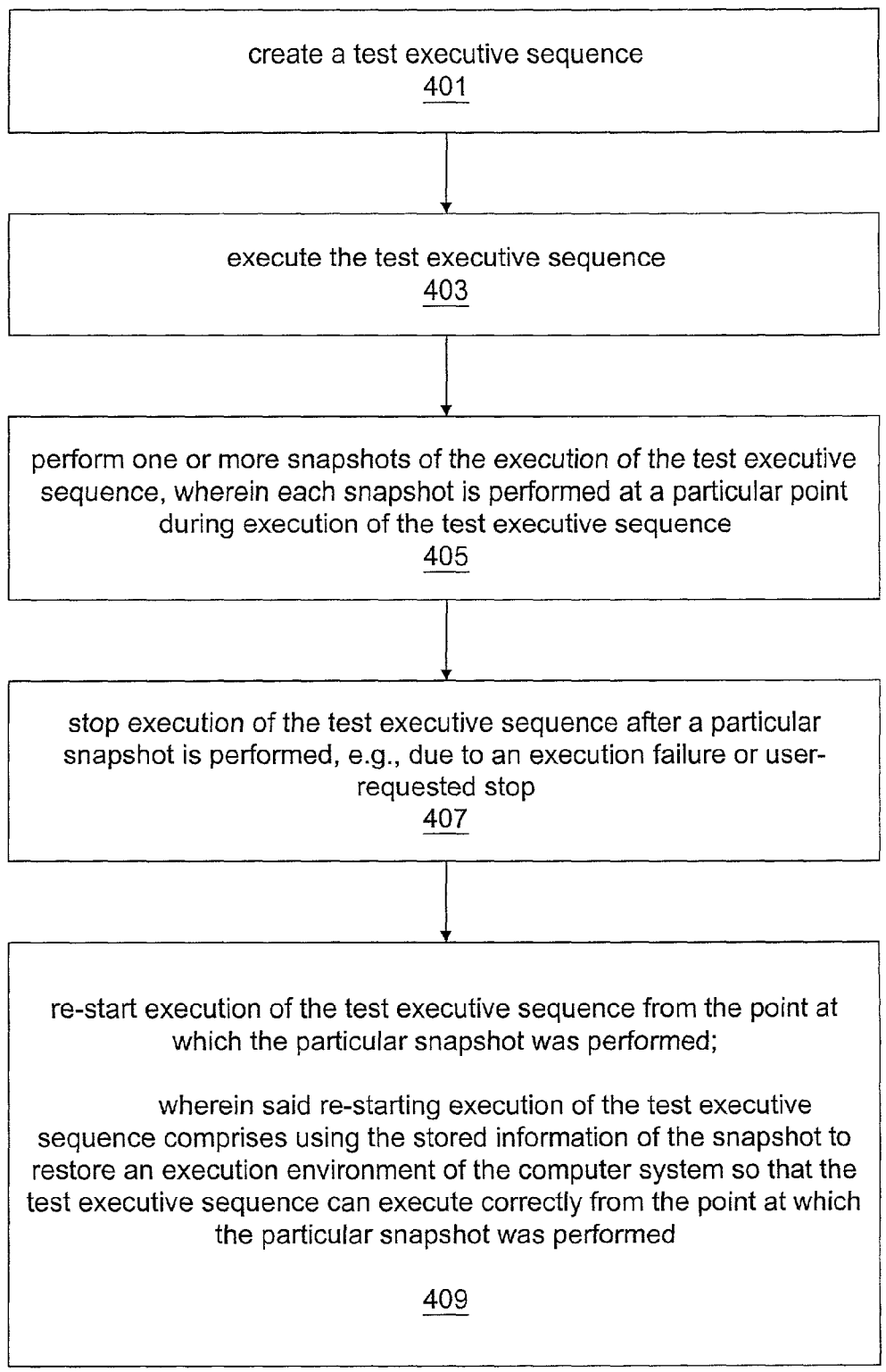
FIG. 7 is a flowchart diagram illustrating one embodiment of a method for re-starting execution of a test executive sequence.

FIG. 7—Restarting Execution of a Test Executive Sequence

FIG. 7 is a flowchart diagram illustrating one embodiment of a method for re-starting execution of a test executive sequence.

In step 401, a test executive sequence may be created, e.g., using a sequence editor such as described above.

In step 403, the test executive sequence may be executed, e.g., under control of a test executive engine such as described above.

In step 405, one or more snapshots of the execution of the test executive sequence may be performed during execution of the test exacutive sequence in step 403, to store execution progress of the test executive sequence. Each snapshot may be performed at a particular point during execution of the test executive sequence. Performing a snapshot may comprise saving all data needed to restore and re-start the execution at the respective point. In one embodiment, the snapshots may be persistently stored, e.g., in a file system or database. In various embodiments, the criteria of when and where to perform the snapshots may be any of various criteria and may be specified in any of various ways.

Any information related to the execution of the test executive sequence that is necessary to successfully re-start an execution may be stored in a snapshot. In one embodiment, this may comprise storing information such as global variable values, sequence local variable values, runtime step property values, previous execution results, etc.

In one embodiment, the method may perform a "full" backup interspersed with various "incremental" backups, wherein incremental backups store only the changes relative to a prior full backup.

In step 407, execution of the test executive sequence may be stopped after a particular snapshot is performed, e.g., due to an execution failure or user-requested stop. For example, in one embodiment, execution of the test executive sequence may be stopped due to a failure of some kind, such as a software or hardware failure. In another embodiment, the user may request to stop the execution. For example, the user may desire to view certain variable values of the sequence, in order to debug the execution of the sequence.

In step 409, execution of the test executive sequence may be re-started from the point at which the particular snapshot was performed. Re-starting execution of the test executive sequence may comprise using the stored information of the particular snapshot to restore an execution environment of the computer system so that the test executive sequence can execute correctly from the point at which the particular snapshot was performed.

The execution may be re-started from any snapshot. For example, in one embodiment, the execution may be re-started from the most recent snapshot. In another embodiment, the user may specify a snapshot from which to re-start the execution. In one embodiment, the user may graphically specify a snapshot from which to re-start execution using a GUI.

In one embodiment, execution may be able to be re-started from virtually every point in the test executive sequence or test executive sequence hierarchy. For example, snapshots may be performed after each step executes. In another embodiment, execution may not be able to be re-started from every point. Thus, it is possible that in the event of a failure requiring restart of the execution, a most recent portion of the execution will not be able to be restored.

In one embodiment, the system may be operable to perform snapshots using certain criteria inherent to or programmed into the test executive software. In another embodiment, the user may specify criteria for when to perform the snapshots.

In one embodiment, snapshots may be performed at certain time intervals. For example, the system may automatically perform a snapshot after a certain amount of time elapses, or the user may specify the time intervals at which the snapshots are desired. In another embodiment, snapshots may be taken based on results of the execution. For example, Boolean expressions or variables may be evaluated, and if the expressions or variables evaluate to True, then snapshots may be taken. The Boolean expression components or variable values may be set by the execution of the test sequence(s).

In one embodiment, a separate or explicit step operable to perform the snapshot may be included in the test sequence. In another embodiment, the user may configure snapshots to be taken by setting a parameter or property of a sequence, and the snapshots are not necessarily performed by a separate step.

Snapshot information may be used to re-start execution of a test executive sequence in any of various ways. In one embodiment, the stack frame of the computer system may be re-created so that it is just as if the execution had run to the re-start point. The states of one or more data structures may also be recreated in memory.

In one embodiment, in addition to re-creating data in memory, it may also be necessary to initialize states of one or more external hardware devices used in the testing process. For example, assume a test executive sequence hierarchy in which a sequence being executed includes a first step that calls an external code module operable to set a first state of a first hardware device to a first value X. Suppose that execution fails in a subsequence of this sequence which is called after the first step, wherein the subsequence depends on the value X. If when the execution is subsequently re-started, the first state of the first hardware device is not set to X, then the subsequence may not execute correctly because the first step in the parent sequence which is operable to set the first state to X will not be executed again.

In one embodiment, this problem may be solved by organizing test executive sequences in step groups. For example, a test executive sequence may comprise a setup group of steps, a main group of steps, a cleanup group of steps, etc. Steps which initialize hardware devices may be placed in the setup group. When execution of the test sequence hierarchy is re-started from within the subsequence, steps in the setup groups of sequences above the subsequence in the hierarchy may be executed. In other words, the sequences above the subsequence may be partially executed. Steps in other groups, such as a main group or cleanup group may not be executed. Any results from steps in these groups necessary to re-start execution may be stored when the snapshots are performed.

Figure 8:
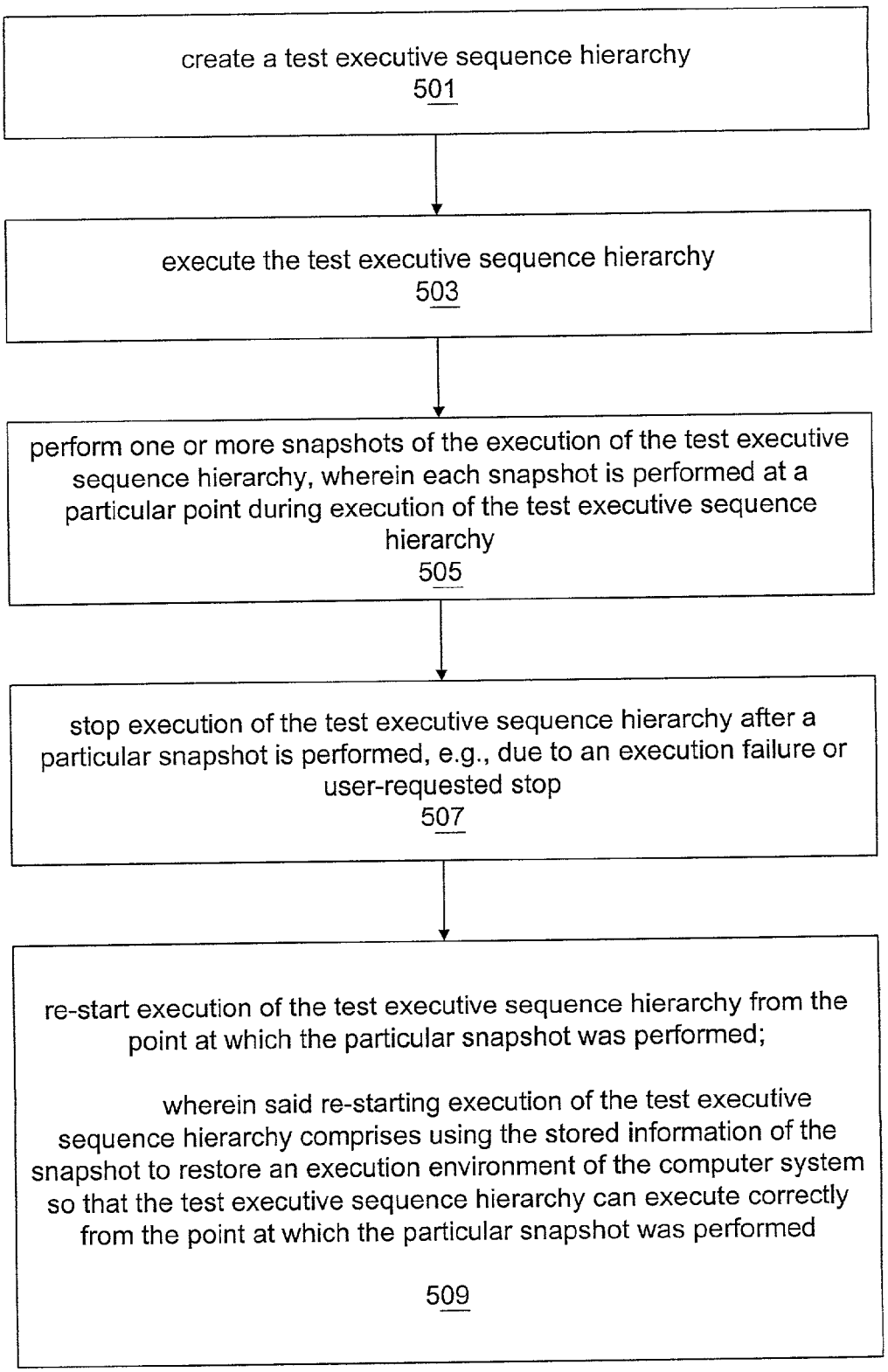
FIG. 8 is a flowchart diagram illustrating one embodiment of a method for re-starting execution of a test executive sequence hierarchy.

FIG. 8—Restarting Execution of a Test Executive Sequence

In one embodiment, the test executive sequence being executed may be a nested sequence within a test executive sequence hierarchy. For example, the hierarchy of test executive sequences may be operable to test a hierarchical system such as described above. Each test executive sequence may map to a sub-component of the system and may be operable to test the respective sub-component. FIG. 8 is a flowchart diagram illustrating one embodiment of a method for re-starting execution of a test executive sequence hierarchy.

In step 501, a plurality of test executive sequences that execute as a hierarchy may be created, e.g., using a sequence editor such as described above. In the plurality of test executive sequences may be displayed hierarchically. For example, FIG. 6 illustrates one example of a GUI display of a tree of test executive sequences.

In step 503, the test executive sequence hierarchy may be executed, e.g., under control of a test executive engine such as described above.

In step 505, one or more snapshots of the execution of the test executive sequence hierarchy may be performed, to store execution progress of the test executive sequence hierarchy. Each snapshot may be performed at a particular point during execution of the test executive sequence hierarchy. Performing a snapshot may comprise saving all data needed to restore and re-start the execution at the respective point. In one embodiment, the snapshots may be persistently stored, e.g., in a file system or database. In various embodiments, the criteria of when and where to perform the snapshots may be any of various criteria and may be specified in any of various ways.

Any information related to the execution of the test executive sequence hierarchy that is necessary to successfully re-start an execution may be stored in a snapshot. In one embodiment, this may comprise storing information such as global variable values, sequence local variable values, runtime step property values, etc.

In step 507, execution of the test executive sequence may be stopped after a particular snapshot is performed, e.g., due to an execution failure or user-requested stop. For example, in one embodiment, execution of the test executive sequence hierarchy may be stopped due to a failure of some kind, such as a software or hardware failure. In another embodiment, the user may request to stop the execution.

In step 509, execution of the test executive sequence hierarchy may be re-started from the point at which the particular snapshot was performed. Re-starting execution of the test executive sequence hierarchy may comprise using the stored information of the particular snapshot to restore an execution environment of the computer system so that the test executive sequence hierarchy can execute correctly from the point at which the particular snapshot was performed.

Thus, re-starting the execution may comprise re-creating or simulating an execution state for the entire chain of test executive sequences leading up to the point at which the snapshot is taken. This may include re-creating partial execution results for the sequence being executed when the snapshot was taken, i.e., for the portion of the sequence leading up to the point at which the snapshot is taken.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A computer-implemented method for storing execution progress of a test executive sequence tree hierarchy, the method comprising:
    executing the test executive sequence tree hierarchy on a computer system, wherein the test executive sequence tree hierarchy includes a plurality of test executive sequences related to each other according to a hierarchical tree relationship such that execution of each child test executive sequence in the tree hierarchy is invoked by a parent test executive sequence in the tree hierarchy, wherein each of the test executive sequences includes a plurality of steps;
    performing one or more snapshots of the execution of the test executive sequence hierarchy, wherein each snapshot is performed at a particular point during execution of the test executive sequence hierarchy;
    wherein, for each snapshot, performing the snapshot comprises storing information usable to re-start execution of the test executive sequence hierarchy from the point at which the snapshot was performed.

2. A computer-implemented method for executing a test executive sequence, the method comprising:
    executing the test executive sequence on a computer system, wherein the test executive sequence comprises a plurality of steps, wherein each step in at least a subset of the steps calls an external code module;
    wherein executing the test executive sequence comprises executing the test executive sequence under control of a test executive engine, wherein the test executive engine is operable to execute the steps in the test executive sequence according to an order of execution specified by the test executive sequence;
    wherein for each step in the at least a subset of the steps, executing the step comprises the test executive engine invoking execution of the external code module called by the step;
    wherein the test executive engine is further operable to perform one or more snapshots of the execution of the test executive sequence, wherein each snapshot is performed at a particular step during execution of the test executive sequence;
    wherein, for each snapshot, performing the snapshot comprises the test executive engine storing information usable to re-start execution of the test executive sequence from the step at which the snapshot is performed;
    wherein the method further comprises:
    stopping execution of the test executive sequence after a particular snapshot is performed in response to user input requesting to stop execution of the test executive sequence; and
    re-starting execution of the test executive sequence from the step at which the particular snapshot was performed in response to user input requesting to re-start execution of the test executive sequence, wherein re-starting execution of the test executive sequence comprises using the stored information of the particular snapshot to restore an execution environment of the computer system so that the test executive sequence can execute correctly from the step at which the particular snapshot was performed;
    wherein the stored information of the particular snapshot enables a user to temporarily stop execution of the test executive sequence and then re-start execution of the test executive sequence without the entire test executive sequence being re-executed from the beginning.

3. The method of claim 2,
    wherein the stored information of the particular snapshot aids the user in debugging the test executive sequence by enabling the user to temporarily stop execution of the test executive sequence and then re-start execution of the test executive sequence without the entire test executive sequence being re-executed from the beginning.

4. A computer-implemented method for executing a test executive sequence, the method comprising:
    executing the test executive sequence on a computer system, wherein the test executive sequence comprises a plurality of steps, wherein each step in at least a subset of the steps calls an external code module;
    wherein executing the test executive sequence comprises executing the test executive sequence under control of a test executive engine, wherein the test executive engine is operable to execute the steps in the test executive sequence according to an order of execution specified by the test executive sequence;
    wherein for each step in the at least a subset of the steps, executing the step comprises the test executive engine invoking execution of the external code module called by the step;
    wherein the test executive engine is further operable to perform a plurality of snapshots of the execution of the test executive sequence, wherein each snapshot is performed at a particular step during execution of the test executive sequence;

wherein, for each snapshot, performing the snapshot comprises the test executive engine storing information usable to re-start execution of the test executive sequence from the step at which the snapshot is performed;

wherein the method further comprises:

stopping execution of the test executive sequence after a particular snapshot is performed;

receiving user input selecting the particular snapshot from the plurality of snapshots; and re-starting execution of the test executive sequence from the step at which the particular snapshot was performed in response to the user input selecting the particular snapshot, wherein re-starting execution of the test executive sequence comprises using the stored information of the particular snapshot to restore an execution environment of the computer system so that the test executive sequence can execute correctly from the step at which the particular snapshot was performed.

5. The method of claim 4, further comprising:

displaying a graphical user interface that visually indicates the plurality of snapshots;

wherein said receiving the user input selecting the particular snapshot from the plurality of snapshots comprises receiving user input to the graphical user interface selecting the particular snapshot from the plurality of visually indicated snapshots.

6. A computer-implemented method for executing a test executive sequence, the method comprising:

executing the test executive sequence on a computer system;

wherein the test executive sequence comprises a plurality of steps, wherein each step in at least a subset of the steps calls an external code module;

wherein said executing the test executive sequence comprises executing the test executive sequence under control of a test executive engine, wherein the test executive engine is operable to execute the steps in the test executive sequence according to an order of execution specified by the test executive sequence;

wherein for each step in the at least a subset of the steps, executing the step comprises the test executive engine invoking execution of the external code module called by the step;

wherein the plurality of steps in the test executive sequence includes a first particular step, wherein the first particular step is operable to cause the test executive engine to perform a snapshot when the first particular step is executed by the test executive engine, wherein performing the snapshot comprises the test executive engine storing information usable to re-start execution of the test executive sequence from the first particular step;

wherein the test executive engine performs the snapshot directly in response to executing the first particular step.

7. A computer-implemented method for re-starting execution of a test executive sequence, the method comprising:

executing the test executive sequence on a computer system, wherein the test executive sequence comprises a plurality of steps, wherein each step in at least a subset of the steps calls an external code module, wherein the steps are operable to control a hardware device to test a unit under test (UUT);

wherein executing the test executive sequence comprises:

executing a first subset of the steps in the test executive sequence, wherein one or more steps in the first subset of steps are operable to set the hardware device to a first state; and performing a first snapshot at a first particular step in the test executive sequence, wherein the first particular step is executed after the first subset of steps, wherein performing the first snapshot comprises storing information usable to re-start execution of the test executive sequence from the first particular step;

wherein the method further comprises:

stopping execution of the test executive sequence after the first snapshot is performed; and re-starting execution of the test executive sequence from the first particular step at which the first snapshot was performed, wherein re-starting execution of the test executive sequence from the first particular step at which the first snapshot was performed comprises re-executing one or more, but not all, of the steps in the first subset of steps that were executed before the first snapshot was performed, wherein the one or more steps are re-executed to reset the hardware device to the first state;

wherein the first snapshot enables execution of the test executive sequence to be re-started from the first particular step without re-executing all of the steps in the first subset of steps that were executed before the first snapshot was performed.

8. The method of claim 7, wherein the test executive sequence is organized into step groups;

wherein said re-executing the one or more, but not all, of the steps in the first subset of steps that were executed before the first snapshot was performed comprises re-executing steps of a first step group, wherein the steps of the first step group comprise steps operable to set the hardware device to the first state.

9. A computer-implemented method for re-starting execution of a test executive sequence, the method comprising:

executing the test executive sequence on a computer system, wherein the test executive sequence comprises a plurality of steps, wherein each step in at least a subset of the steps calls an external code module;

wherein executing the test executive sequence comprises:

executing a first subset of the steps in the test executive sequence; and performing a first snapshot at a first particular step in the test executive sequence, wherein the first particular step is executed after the first subset of steps, wherein performing the first snapshot comprises storing information usable to re-start execution of the test executive sequence from the first particular step;

wherein the method further comprises:

stopping execution of the test executive sequence after the first snapshot is performed; and re-starting execution of the test executive sequence from the first particular step at which the first snapshot was performed, wherein re-starting execution of the test executive sequence from the first particular step at which the first snapshot was performed comprises re-executing one or more, but not all, of the steps in the first subset of steps that were executed before the first snapshot was performed;

wherein the first snapshot enables execution of the test executive sequence to be re-started from the first particular step without re-executing all of the steps in the first subset of steps that were executed before the first snapshot was performed.

10. A computer-implemented method for executing a test executive sequence, the method comprising:
- executing the test executive sequence on a computer system, wherein the test executive sequence comprises a plurality of steps, wherein each step in at least a subset of the steps calls an external code module;
- wherein said executing the test executive sequence comprises executing the test executive sequence under control of a test executive engine, wherein the test executive engine is operable to execute the steps in the test executive sequence according to an order of execution specified by the test executive sequence;
- wherein for each step in the at least a subset of the steps, executing the step comprises the test executive engine invoking execution of the external code module called by the step;
- wherein the test executive engine is operable to perform a first snapshot of the execution of the test executive sequence at a first particular step in the test executive sequence, wherein the test executive engine performs the first snapshot in response to evaluating one or more values set by execution of the test executive sequence, wherein performing the first snapshot at the first particular step comprises the test executive engine storing information usable to re-start execution of the test executive sequence from the first particular step.

11. The method of claim 10,
- wherein said performing the first snapshot in response to evaluating the one or more values set by execution of the test executive sequence comprises performing the first snapshot in response to determining that a Boolean condition is True, wherein the Boolean condition is based on the one or more values set by execution of the test executive sequence.

12. A computer-readable memory medium comprising program instructions for executing a test executive sequence, wherein the program instructions are executable to implement:
- executing the test executive sequence on a computer system, wherein the test executive sequence comprises a plurality of steps;
- performing a first snapshot of the execution of the test executive sequence, wherein the first snapshot is performed at a particular step during execution of the test executive sequence;
- stopping execution of the test executive sequence in response to first user input after the first snapshot is performed; and
- re-starting execution of the test executive sequence from the step at which the first snapshot was performed in response to second user input, wherein said re-starting uses information from the first snapshot.

13. The memory medium of claim 12,
- wherein the first snapshot enables a user to temporarily stop execution of the test executive sequence and then re-start execution of the test executive sequence without the entire test executive sequence being re-executed from the beginning.

14. The memory medium of claim 12,
- wherein said re-starting execution of the test executive sequence comprises using the information from the first snapshot to restore an execution environment of the computer system so that the test executive sequence can execute starting from the step at which the first snapshot was performed.

15. The memory medium of claim 14,
- wherein said restoring the execution environment of the computer system comprises using the information from the first snapshot to re-create a stack frame of the computer system.

16. The memory medium of claim 14,
- wherein said restoring the execution environment of the computer system comprises using the information from the first snapshot to restore results of steps in the test executive sequence executed prior to the step at which the first snapshot was performed.

17. The memory medium of claim 16,
- wherein said restoring the results of steps in the test executive sequence executed prior to the step at which the first snapshot was performed comprises restoring execution results of external code modules called by steps executed prior to the step at which the first snapshot was performed.

18. The memory medium of claim 12,
- wherein performing the first snapshot comprises storing information representing execution results of steps in the test executive sequence executed prior to the step at which the first snapshot is performed.

19. The memory medium of claim 18,
- wherein said storing the information representing the execution results of steps in the test executive sequence executed prior to the step at which the first snapshot is performed comprises storing information representing execution results of external code modules called by steps executed prior to the step at which the first snapshot is performed.

20. A computer-readable memory medium comprising program instructions for executing a test executive sequence, wherein the program instructions are executable to implement:
- executing the test executive sequence on a computer system, wherein the test executive sequence comprises a plurality of steps;
- performing a plurality of snapshots of the execution of the test executive sequence, wherein each snapshot is performed at a particular step during execution of the test executive sequence;
- stopping execution of the test executive sequence after a particular snapshot is performed;
- receiving user input selecting a first snapshot from the plurality of snapshots; and
- re-starting execution of the test executive sequence from the step at which the first snapshot was performed in response to the user input selecting the first snapshot, wherein said re-starting uses information from the first snapshot.

21. The memory medium of claim 20, wherein the program instructions are further executable to implement:
- displaying a graphical user interface that visually indicates the plurality of snapshots;
- wherein said receiving the user input selecting the first snapshot from the plurality of snapshots comprises receiving user input to the graphical user interface selecting the first snapshot from the plurality of visually indicated snapshots.

22. The memory medium of claim 20,
- wherein said re-starting execution of the test executive sequence comprises using the information from the first snapshot to restore an execution environment of the computer system so that the test executive sequence can execute starting from the step at which the first snapshot was performed.

23. The memory medium of claim 22,
wherein said restoring the execution environment of the computer system comprises using the information from the first snapshot to re-create a stack frame of the computer system.

24. A computer-readable memory medium comprising program instructions for executing a test executive sequence, wherein the program instructions are executable to implement:
   executing the test executive sequence on a computer system, wherein the test executive sequence comprises a plurality of steps, wherein executing the test executive sequence comprises executing the plurality of steps;
   wherein the plurality of steps includes a first step, wherein the first step is configured to cause a snapshot of the execution of the test executive sequence to be performed, wherein performing the snapshot comprises storing information usable to re-start execution of the test executive sequence from the first step;
   wherein the program instructions are further executable to implement:
   re-starting execution of the test executive sequence from the first step, wherein said re-starting uses the stored information from the snapshot.

25. The memory medium of claim 24,
wherein said re-starting execution of the test executive sequence comprises using the stored information from the snapshot to restore an execution environment of the computer system so that the test executive sequence can execute starting from the first step.

26. The memory medium of claim 25,
wherein said restoring the execution environment of the computer system comprises using the stored information from the snapshot to re-create a stack frame of the computer system.

* * * * *